Aug. 5, 1947.  J. M. PETTY ET AL  2,425,122
PHOTOGRAPHIC CODE RECORDING AND REPRODUCING DEVICE
Filed Sept. 25, 1944
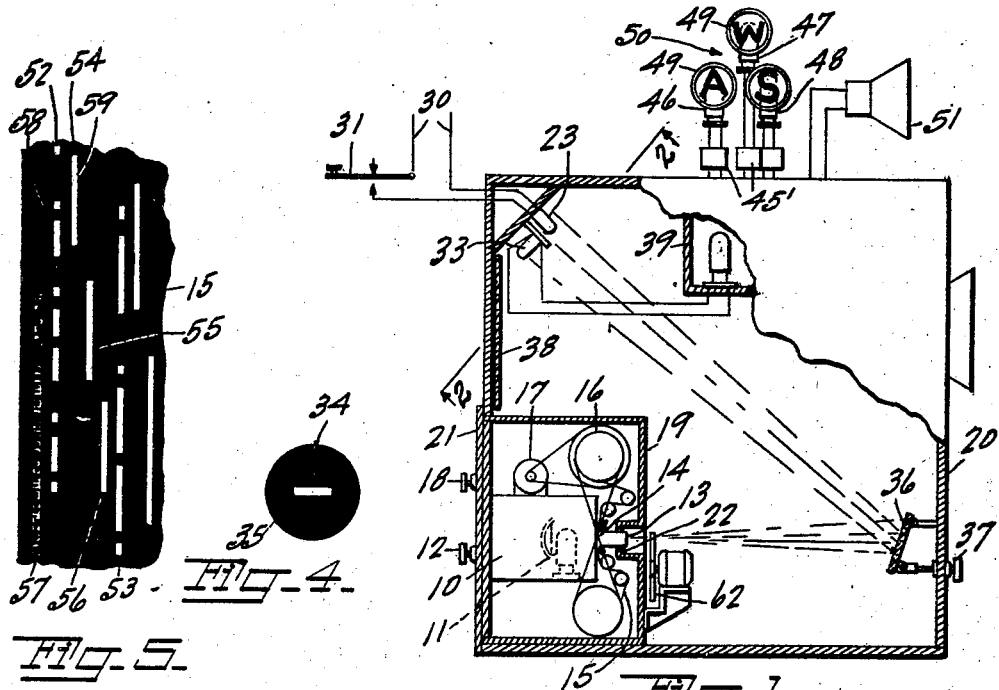
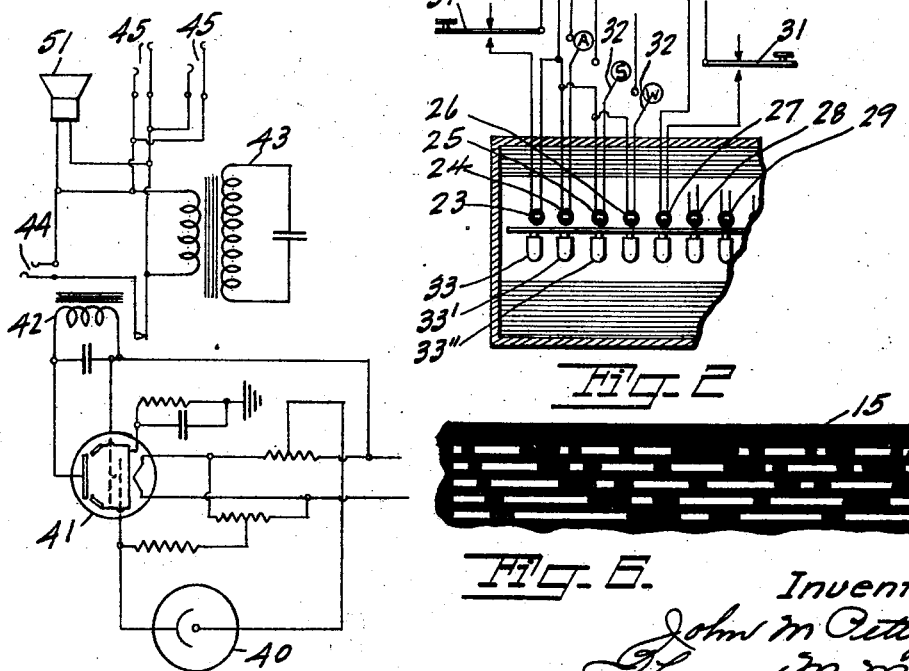

Patented Aug. 5, 1947

2,425,122

UNITED STATES PATENT OFFICE 2,425,122

PHOTOGRAPHIC CODE RECORDING AND REPRODUCING DEVICE

John M. Petty, Berkeley, Calif., and Thomas M. Morse, Carlinville, Ill.

Application September 25, 1944, Serial No. 555,724

8 Claims. (Cl. 178—115)

This invention, photographic code recording and reproducing means, provides a new and improved method of teaching telegraphy, either wire or radio. It provides a new means and method for recording and reproducing Morse code signals in sound at different speeds while simultaneously visually indicating each character transmitted, and designating the key on the keyboard of a standard typewriter which will produce the same character. It records and reproduces the individual sending characteristics of the telegrapher instead of the precise dots, dashes and spaces of the customary machine-made records, and which characteristics are of special significance because when a student is taught telegraphy by the precision machine-made signals he is usually unable to adapt his ear to the variable hand sending characteristics without a further period of training under the supervision of trained telegraphers and conventional transmitting and receiving equipment.

Morse code can be recorded on the same strip or ribbon of film simultaneously by several telegraphers operating individual keys at the same or different speeds, with all sending the same or different messages or characters, for which reason, the coordinated sending characteristics of an entire class can be simultaneously recorded on a single strip of film, thus clearly showing the relative advancement of the individual students and their relative sending speeds.

With a record which contains the same message or different messages at different speeds of transmission, the student can select the exact speed of reception in conformity with his advancement and capabilities. The same strip can contain many records of the same message at speeds ranging from very slow to very fast, and all hand transmitted, enabling a beginner to select the slowest speed and switch to higher speeds at will, and thus advance in speed step by step.

For starting training as a telegrapher the student can select a record which not only produces the conventional clicks or buzzes, but which also illuminates a character corresponding to the coded character being transmitted and its relative position on a conventional typewriter keyboard. Furthermore, the same device is selectively used for recording and for transmitting, and either wire or radio messages can be recorded and reproduced.

The objects and advantages of the invention are as follows:

First, to provide a unitary device by which Morse telegraphic code signals can be recorded and reproduced at will.

Second, to provide a device as outlined by which Morse code signals embodying the individual sending characteristics of telegraphers or students can be accurately recorded and transmitted.

Third, to provide a device as outlined by which messages may be recorded simultaneously on a single record, for recording the individual characteristics, including omissions, errors, lapses and non-uniformity, and speeds of a number of students or telegraphers.

Fourth, to provide a device as outlined by which messages or characters can be recorded in Morse code simultaneously with controlling signals for controlling sources of illumination for individually indicating the individual characters as transmitted and the location of each character on the keyboard of a standard typewriter.

Fifth, to provide a device as outlined in which telegraphic code messages may be recorded simultaneously by a number of telegraphers operating, or by re-runs of the recording means by one telegrapher, with the different record tracks impressed at different speeds from very slow to very fast, and from which completed recording selection can be made at will as to the speed or reproduction required or desired.

Sixth, to provide a device as outlined by which sounder signals can be converted into buzzer signals for radio telegraphy and the signals controlled as to pitch.

Seventh, to provide a device as outlined by which telegraphic signals can be recorded and then reproduced by all of the various means of identification including sounder, buzzer, loudspeaker, ear-phones, illuminated characters, and in light and shadow on a projection screen.

Other objects and advantages of the invention will become apparent as the following description is read on the drawings forming a part of this specification, in which:

Fig. 1 is a side elevation of the invention with a portion of the side panel removed and shown partly in section.

Fig. 2 is a section taken on line 2—2 of Fig. 1 and shown fragmentarily.

Fig. 3 is a wiring diagram showing a suitable circuit for reproduction of the recorded signals and for controlling the illumination of characters and sound translating devices, one such amplifier and relay circuit being provided for each track on the record.

Fig. 4 is an end elevation of one of the recording lamps, showing the light slit with the rest of the lamp being opaqued.

Fig. 5 is an enlarged fragmentary view of a section of film record showing the recording of telegraphic signals and light controls or character illumination control tracks.

Fig. 6 is an enlarged fragmentary view of a recording showing a plurality of code tracks recorded at different speeds of sending.

The invention consists of a combined camera and projector having a lens, means for feeding a strip of film or other photo-sensitive medium at a uniform speed in the focal plane of the lens, a source of illumination for the projector and separate control means therefor, a series of lamps located in the object plane of the lens, and switches or telegraph keys for manually controlling energization of the lamps selectively, a like series of photo-cells located adjacent to the respective lamps, an amplifier and relay circuit for each photo-cell, and suitable loud-speakers, ears-phones, relays, sounders, buzzers, and a projection screen for translating light variations or interruptions into code signals, illuminated characters, and light-and-shadow projections, from a recording.

The combined camera and projector can be made from any still or motion-picture projector. In the case of a motion picture projector it will be necessary to remove the shutter and the step feed or framing mechanism and arrange the feed for uniform, continuous, slow speed feeding of the film or recording, and to arrange the light source for separate control so that it can be extinguished when a message is to be recorded on a photo-sensitive ribbon.

As illustrated, the combined camera and projector indicated at 10 is provided with a conventional projection lamp and reflector unit 11 which is separately controlled by a suitable switch 12, and with a suitable lens 13. A suitable passage is provided in the focal plane of the lens at 14 and having a close fit on the specific film or ribbon 15 to be used for the recordings, 16 mm. or 35 mm. positive film being contemplated as standards. A suitable feed mechanism 16 for feeding an endless loop of film, or standard lengths with standard reels, and driven by a motor 17 at a uniform speed, is mounted for cooperation with the projector, and this motor is separately controlled by a switch 18. This entire unit is housed in a light-tight cabinet 19 which slidably fits within a portion of the main cabinet 20, the cabinet 19 having a door 21 to provide access to the projector and feed mechanism, and serving as a closure for the opening in the cabinet 20. A light-tight passage 22 fitting around the lens restricts passage of light solely through and into the lens, so that there can be no fogging of sensitive film within the cabinet.

Mounted in the object plane of the lens 13 is a series of lamps 23 to 29 each of which has its own circuit including a source of power 30 and a telegraph key 31, or manually operable switch 32. Located in the same plane and adjacent each lamp is a photo-cell 33, one for each lamp. The lamps may be conventional 7 watt filament type for normal to slow keying, but for sending speeds over 30 words per minute, argon glow lamps are preferable, and are actually more satisfactory for any speed. Irrespective of the type of lamp used, only a relatively small rectangular portion is allowed to transmit light, the rest of the lamp bulb being blacked out or opaqued as indicated at 34 with the clear aperture or image slit being indicated at 35. The width of this slit 35 establishes the width of the code track on the film during recording.

To provide for a minimum size of cabinet 20, reflectors 36 may be mounted and made adjustable within the cabinet as indicated at 37, to obtain a greater reduction in width of the impressed latent image on the film, and to obtain a greater enlargement of the illuminated code image on the panoram screen 38.

Each photo-cell has its own amplifying and relay circuit illustrated in one form in Fig. 3 and indicated at 39 in Fig. 1. This circuit as shown includes a 918 photo-electric cell indicated at 40, a 50L6 amplifier indicated at 41, a 2500 ohm relay at 42, a key-click filter at 43, together with suitable resistances, condensers, potentiometers, terminals or a jack 44 for a 5 to 20 volt tone source, and other jacks 45 for ear-phones or for connection through suitable relays 45' to lamps 46, 47 and 48 for illuminating the characters 49 on an enlarged replica of a conventional typewriter keyboard 50. A loud-speaker 51 can also be used or substituted.

The fragmentary portion of film in Fig. 5 shows two code tracks 52 and 53, and three character illuminating tracks 54, 55 and 56 for each code track. The number of character illuminating tracks can be increased to any desired number and is therefore not limited to the three shown. The portion of a recording shown in Fig. 6 shows five code tracks of gradually decreasing speeds from top to bottom. A voice sound track 57 can be printed in if it is desired to simultaneously give oral instructions or pointers.

The operation of the invention is as follows:

For recording Morse code at different speeds, the same telegraph operator can record the various speeds by re-running the photo-sensitive film through the camera for each track, with the operator operating through a different lamp 23 to 29 and its associated key each time, and each time changing his speed of sending, or, as many telegraph operators as there are lamps can send simultaneously but at different speeds to impress all of the code tracks in a single pass of the film.

To record a message, the feeding mechanism 16 is loaded with the proper film which is threaded through the passage at 14 in the focal plane of the lens. After loading, the cabinet 19 is placed in position in the cabinet 20, the switch 18 is closed to the motor 17 which drives the feeding mechanism at a slow, uniform speed. The telegraph operator sends code by means of a key 31, which makes circuit through its associated lamp 23 to 29, and the image of the slit is impressed on the sensitive film 15 which is continuously moving, whereby, for dots in which the closing and opening of the key is virtually instantaneous, the registration on the film will be very short, while for dashes in which the key is closed for a more or less short period, the length of the impression on the film is equal to its distance of travel during that period. Between the closed-key periods there would be no exposure of the film.

For recording a Morse code track along with character illuminating controls, regular telegraph keys 31 can be used by identifying the keys with different letters except those to be used for sending code, so that the same equipment can be used for both code and character indicators. If desired, normally open switches 32 suitably identified can be used for the control tracks.

If visual signals are to be provided, the operator sends a letter and simultaneously closes another key, as 32, identified by the same letter. For example: If the operator sends the letter "A" and simultaneously closes the key "A" 32, the code "A" will be impressed at 58 and a plain dash will be impressed at 59 in the next track. If he then sends the letter "W" and closes key "W" 32, the code "W" will be formed in follow relation to the code "A" as indicated and a plain dash will be formed in the next track 55. Keying for light controls can be carried out manually, photometrically, electrically, or mechanically, as by a selector system.

When exposure of the film has been completed, it is removed and processed, preferably by the reversal process to give a direct positive, or as a negative with a positive printed therefrom, as indicated in Figs. 5 and 6, thus providing for a minimum of light within the cabinet 20 during projection, and depending upon energization of the photo-cell for actuation of the mechanism rather than on interruption of energization. Obviously a negative could be used by suitably changing the relay and amplifier circuit to suit.

The transparency produced is loaded on the feed mechanism and threaded through the slit at 14 for projection. Referring to the arrangement in Fig. 5, the switch 18 is closed to operate the feed mechanism, and the switch 12 is closed to energize the projection lamp 11. A beam from each track is cast onto the reflector 36 and is thence reflected to the screen 38 where a traveling light-and-shadow image of the code can be observed, this traveling image being simultaneously intercepted by the respective photo-cells 33, the energy set up being transmitted to the respective amplifiers and relays, 39, where the signals or traveling images are translated into illuminated characters, light, or sound. As sound, it can be translated through a loudspeaker 51, through ear-phones or a sounder (not shown) to be plugged in through one of the jacks 45, and, with the light control tracks of Fig. 6, into illuminated characters through the lamps 46, 47 and 48.

When the coded "A" at 58 is intercepted by a photo-cell, it is translated into sound in the form of audible dots and dashes, and simultaneously the light through the long dash at 59 is intercepted by the next photo-cell 33', illuminating the lamp 46 to show the character "A" and its position on the enlarged replica of the typewriter keyboard 59. When the next character "W" is translated into sound through the same photocell 33, the long dash 55 in the next track energizes photo-cell 33'', producing the coded signal "W" in sound and simultaneously illuminating the lamp 47 to show the character "W" and its position on the keyboard. These lamps 46 to 48 can be plugged through jacks 45 or they may be on separate relays 45' of the magnetic type, and any number of letter identifying circuits can be provided, for the entire key-board if desired. However it is desirable to teach a few letters at a time, so that a track would consist of a repetition of the same letters in different sequences.

With the arrangement in Fig. 6 all amplifiers will be operated simultaneously so that the student can plug into the jack 45 on whichever amplifier his advancement and skill warrant.

A number of students or telegraph operators can be given tests simultaneously by having each operate a key to form a separate code track on sensitive film, which, when processed and reproduced and translated will clearly indicate relative speeds, aptness and other characteristics of his sending, and point out all faults, such as nonuniformity, skipping and omissions.

For International Morse or radio telegraphy, a beam chopper 62 is mounted on the front of the projector and camera housing 19 in such position as to interrupt the beam, and is preferably made adjustable as to speed so as to make a change in pitch possible, the average being around 1000 cycles per second. Under such conditions the continuous dashes and dots of the recording will be split into a multiplicity of vibrations to translate as a buzzer through the loud-speaker or ear-phones.

For standard wire telegraphy obviously, the beam chopper would not be used as the buzzing sound is not desired, instead, the uninterrupted clicks of a sounder are essential.

We claim:

1. A Morse code recording and reproducing machine, in combination; a light-proof casing and a dark chamber having a lens passage opening into said light-proof casing; a combined camera and projector mounted within said dark chamber and including a lens within said lens passage, a film passage in the focal plane of said lens, and a projection lamp in projecting relation to said film passage and lens; a source of current including a circuit having a switch for control of said projection lamp; means for feeding a ribbon of film at uniform speed through said film passage within said dark chamber; an exposure lamp in the object plane of said lens and a source of current therefor and an image slit formed on said lamp to limit the size of the image formed by the lamp; a telegraph key for controlling illumination of said exposure lamp; a photo-cell located adjacent to said exposure lamp out of range of rays passing through said image slit and in the same object plane; an amplifier for said photo-cell and sound translating means actuable by said amplifier; whereby code signals are impressible on a strip of photo-sensitive film fed in the focal plane of said lens through exposure by said exposure lamp under manual control of said telegraph key when said switch is open, and is translatable into light and sound when said switch is closed through projection of the image from the processed film to said photo-cell.

2. A Morse code recording and reproducing apparatus comprising; sound translating means and character indicating means a combined camera and projector having a combined selective light and dark chamber including a projection lamp and a circuit and control switch therefor, a lens and means for uniformly and uninterruptedly feeding a photographic film in the focal plane of said lens; a series of key-controlled light sources located in the object plane of said lens for impressing code and control characters in parallel tracks on said photographic film; a like series of photo-electric cells located in the object plane of said lens and including black-out means for guarding said photo-electric cells from rays from said light sources, and a relay and amplifier circuit for each photo-electric cell and including means for selective coupling of said sound translating means and character indicating means to the respective relay and amplifier circuits.

3. A structure as defined in claim 2; said light source each including a bulb; each bulb having a rectangular slit formed at the end thereof for passage of light, with the remainder of the bulb other than the area of said slit being opaqued and defining said blackout means, said slit defining the width of the code tracks to be impressed on said photographic film during recording of code.

4. A code receiving and transmitting unit comprising; a cabinet having a removable dark chamber located therein, and a projection chamber within said dark chamber and having a projection lamp mounted therein, and a source of current and a control switch for said projection lamp; a lens mounted in one wall of said projection chamber and projecting through the wall of said dark chamber into said cabinet, and means in said dark chamber for feeding a ribbon of photographic film in the focal plane of said lens; an exposure lamp having a restricted rectangular light slit in the object plane of said lens, and a source of current and a circuit therefor including a telegraph key for control of said exposure lamp; a photo-cell located in the same vertical plane as said exposure lamp and adjacent thereto and isolated against exposure thereby, and amplifying and sound translating means in circuit with said photo-cell, and a source of current therefor.

5. A structure as defined in claim 4; in which a plurality of exposure lamps are arranged in transverse series with a separate circuit including a key for each lamp, and with a photo-cell for each lamp and a separate sound translating and amplifying circuit for each photo-cell, for simultaneous registration or reproduction of a plurality of parallel sound tracks on a single strip of photographic film.

6. A structure as defined in claim 4, in which a multiplicity of exposure lamps are arranged in series throughout the width of the object plane of the lens, and a separate circuit and key for each lamp, and a photo-cell in vertical alignment with each lamp, and a circuit and translating means for each photo-cell; said lamps through their respective keys being selectively operable to expose Morse code and control characters in parallel tracks through said lens on a sensitive film in said dark chamber, and said photo-cells being respectively energizable through projection by said projection lamp through the processed film and said lens.

7. A code receiving and transmitting unit comprising; a cabinet; a first dark chamber removably located in said cabinet, and a second dark chamber removably located in said first dark chamber and having a lens mounted in one end, and a diametric film slit in the focal plane of said lens; a lens opening through one wall of said first dark chamber for projection of said lens therethrough, and a source of projection illumination within said second dark chamber and a source of current and a control switch therefor, and photographic film feeding means and driving means therefor within said first dark chamber for feeding film through said film slit; a rectangular source of exposure illumination of limited area located in the object plane of said lens and a source of current and a circuit therefor including a normally open switch; a photo-cell located adjacent to and in the same vertical plane as said source of exposure illumination and isolated against exposure thereby, and amplifying means and relay means and a source of current in circuit with and controlled by said photo-cell and having a plurality of outlets for connection to translating devices.

8. A structure as defined in claim 7, in which a series of sources of exposure illumination with individual circuits and normally open switches are located throughout the width of the object field of the lens, and with a photo-cell and its amplifying and relay means and plurality of outlets, for each source of exposure illumination, each of said sources of exposure illumination consisting of an electrically energizable illuminant with illumination confined to a horizontal narrow slit in line with the illuminant.

JOHN M. PETTY.
THOMAS M. MORSE.

REFERENCES CITED

The following references are of record in the file of this patent:

UNITED STATES PATENTS

| Number | Name | Date |
| --- | --- | --- |
| 1,848,799 | Papalia | Mar. 8, 1932 |
| 2,341,222 | Lancaster | Feb. 8, 1944 |
| 2,251,902 | Dunning | Aug. 5, 1944 |
| 1,950,011 | Scheibell | Mar. 6, 1934 |
| 706,743 | Fessenden | Aug. 12, 1902 |
| 2,082,877 | Durand | June 8, 1937 |
| 2,300,038 | Wright | Oct. 27, 1942 |
| 2,031,952 | Horton | Feb. 25, 1936 |
| 2,279,242 | O'Brien | Apr. 7, 1942 |
| 2,044,333 | Schmidt | June 16, 1936 |
| 1,950,091 | Owens | Mar. 6, 1934 |
| 1,804,136 | Wright | May 5, 1931 |
| 2,307,099 | Apperley | Jan. 5, 1943 |